(12) United States Patent  (10) Patent No.: US 9,212,652 B2
Alexander  (45) Date of Patent: Dec. 15, 2015

(54) WIND TURBINE USING SAILS AFFIXED TO CHAINS

(71) Applicant: Robert F. Alexander, Whitewater, CA (US)

(72) Inventor: Robert F. Alexander, Whitewater, CA (US)

( * ) Notice: Subject to any disclaimer, the term of this patent is extended or adjusted under 35 U.S.C. 154(b) by 0 days.

(21) Appl. No.: 13/694,763

(22) Filed: Apr. 15, 2013

(65) Prior Publication Data

US 2014/0306456 A1   Oct. 16, 2014

(51) Int. Cl.
*F03D 5/02* (2006.01)
*F03D 9/00* (2006.01)

(52) U.S. Cl.
CPC . *F03D 5/02* (2013.01); *F03D 9/002* (2013.01)

(58) Field of Classification Search
CPC ........................................................ F03D 9/00
USPC .................................................. 415/5; 290/55
See application file for complete search history.

(56) References Cited

U.S. PATENT DOCUMENTS

| | | | | |
|---|---|---|---|---|
| 685,016 | A | * | 10/1901 | Towsley ............................. 415/5 |
| 1,525,600 | A | * | 2/1925 | Woolever .......................... 415/5 |
| 3,957,390 | A | * | 5/1976 | Miller ............................... 415/5 |
| 4,093,398 | A | * | 6/1978 | Miller ................................ 416/8 |
| 4,536,125 | A | * | 8/1985 | Herman et al. ................... 415/5 |
| 7,615,883 | B2 | * | 11/2009 | Meheen ........................... 290/55 |
| 7,709,971 | B2 | * | 5/2010 | Sane et al. ....................... 290/43 |
| 7,862,290 | B2 | * | 1/2011 | Diederich ......................... 415/5 |
| 8,618,682 | B2 | * | 12/2013 | Syrovy ............................ 290/44 |

FOREIGN PATENT DOCUMENTS

| WO | WO 0001945 A1 | * | 1/2000 |
|---|---|---|---|
| WO | WO2014/006608 A1 | * | 1/2014 |

* cited by examiner

*Primary Examiner* — Joseph Waks
(74) *Attorney, Agent, or Firm* — Stetina Brunda Garred & Brucker

(57) ABSTRACT

A sail on a chain wind turbine comprises a plurality of preferably rectangular sails each attached at its edges to a pair of parallel looped chains. The chains are each routed along a triangular path engaging three circular sprockets selected for low friction rotation. The upper extent of the assembly forms the top apices of the chain triangles with two opposing sprockets located at each such apex. The remaining circular sprockets form the base of the triangle with one sprocket located at each end of the base on each side of a frame. The two chains are precisely congruent to one another with respective sprockets being axially aligned. One such pair of aligned sprockets is interconnected by a shaft which rotates from the force of a wind against the sails. A linkage rotates an electrical generator shaft as the sails catch the wind.

6 Claims, 3 Drawing Sheets

WIND TURBINE USING SAILS AFFIXED TO CHAINS

BACKGROUND OF THE INVENTION

1. Field of the Invention

The present invention relates generally to the field of wind turbines and more particularly to a wind turbine having a plurality of wind-catching sails attached to a pair of parallel chains each configured as a closed loop for driving sprockets which, in turn, rotate a shaft of an electrical generator.

2. Background Art

Conventional wind turbines employ propeller blades rotating about a horizontal axis to turn a shaft of an electrical generator. Unfortunately wind turbines of such conventional configuration have limited efficiencies due to the high propeller tip speeds. In addition, the propeller angle of attack varies with distance to the center. The sweet spot of efficiency is limited and small. Therefore, there is a need for a wind turbine which is configured to be more efficient over a broader range of wind speeds. In observing wind surfers using a triangular sail to speed along at speeds of about 40 MPH, Applicant conceived an improvement in wind turbines wherein sails of rectangular shape (to double the developed thrust compared to wind surfers) are secured to chains which are more efficient than gears used in propeller wind turbine designs. A sail on a chain is more efficient than an elongated propeller blade because a rectangular sail promotes full power development evenly across the entire sail surface. Therefore, Applicant believes that the uniquely-configured wind turbine employing sails on a chain as disclosed herein for example, can render obsolete more conventional propeller-based wind turbines and help make America less dependent on the need for importing foreign oil.

SUMMARY OF THE INVENTION

The disclosed embodiment of the sail on a chain wind turbine comprises a plurality of preferably rectangular sails each attached at its edges to a pair of parallel looped chains. The chains are each routed along a triangular path engaging three circular sprockets selected for low friction rotation. The upper extent of the assembly forms the top apices of the chain triangles with two opposing sprockets located at each such apex. The remaining circular sprockets form the base of the triangle with one sprocket located at each end of the base on each side of a frame. The two chains are precisely congruent to one another with respective sprockets being axially aligned. One such pair of aligned sprockets of the two congruent chains are interconnected by a shaft which is connected to a first gear which rotates with the shaft from the force of a wind against the sails. A linkage engages the first gear by means of a small transmission chain for rotation of an electrical generator shaft as the sails catch the wind. In the embodiment disclosed herein, three sails are employed each placed symmetrically along the loops of the two chains so that they are spaced from one another by about a third of the total lengths of the chains. Of course, it will be readily apparent that an additional number of sails may be deployed to optimize the operating efficiency of the disclosed turbine. Moreover, it will also be apparent that each such sail may be of different size than that shown in the disclosed embodiment. By way of example, each sail may be larger in a direction along the path of the chains so as to catch a greater area of wind and respond with a greater force to rotate the generator shaft.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which.

DETAILED DESCRIPTION OF A PREFERRED EMBODIMENT

Figure 1:
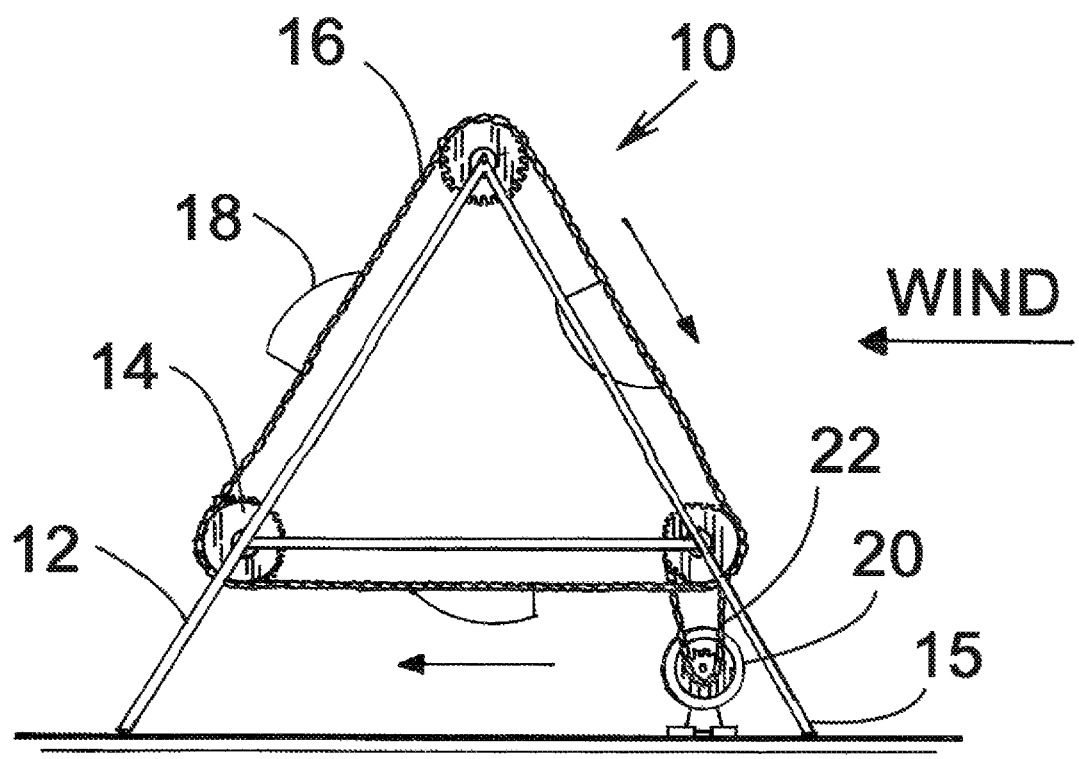
FIG. 1 is a side view of a sail on chains wind turbine in accordance with an embodiment of the invention hereof.
Figure 2:
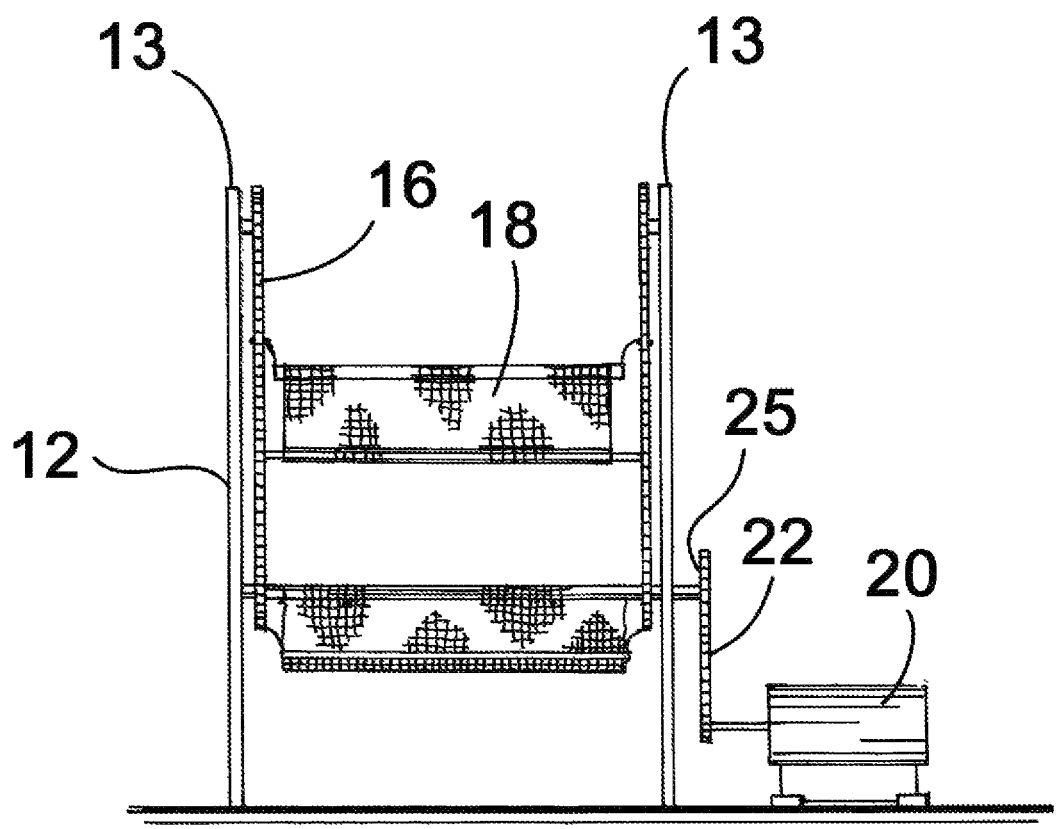
FIG. 2 is a front view thereof.
Figure 3:
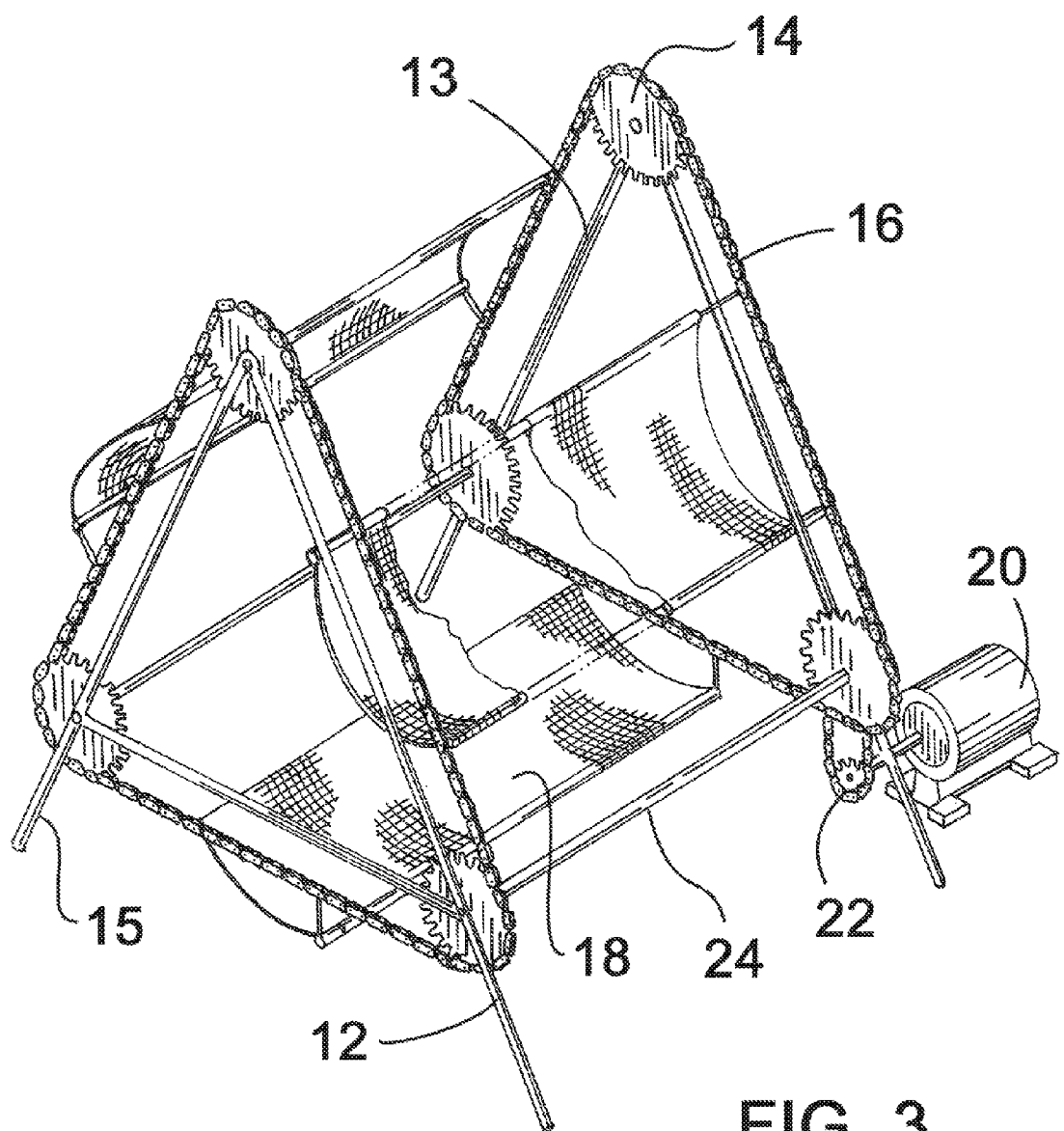
FIG. 3 is a three-dimensional view thereof.

Referring to the accompanying drawings, it will be seen that a disclosed embodiment of a wind turbine in accordance with the present invention is shown in FIGS. 1-3. More specifically, a wind turbine 10 comprises a steel tubular frame 12, a plurality of sprockets 14, a pair of chains 16, a plurality of rectangular sails 18, an electrical generator 20 and a transmission linkage 22. The frame 12 is preferably formed of a pair of sides 13 having a generally triangular configuration that is self-supporting with extending lower legs 15. Each side of the frame 12 has three circular sprockets 14 located at respective apices of the corresponding triangular side 13. Two chains 16, each configured as a closed loop, are positioned to engage the respective sprockets 14 of each frame side 13.

A plurality of rectangular sails 18 is provided to catch the wind and create a chain moving force from the pressure of the wind. Each of the three such sails shown in the drawings is attached to the two chains 16 in the manner shown best in FIG. 3 to present a rectangular surface to the wind. The wind's effect on the sails results in a net force which rotates the chains in unison about the frame and sprockets. The sprockets 14 rotate in response to the chain's motion about the frame 12 and their rotation is synchronized by the chains and by a shaft 24. A transmission linkage 22 which as shown in FIGS. 2 and 3, may be in the form of a small chain, is driven by the shaft 24 along with a small gear 25 and connects to the generator 20 to produce electricity.

The sail on a chain embodiment of the wind turbine shown herein may be easily turned in response to changing wind direction in a manner that is well-known to the wind turbine industry using a conventional turning mechanism such as a wind vane and a turntable.

Thus it will now be understood that the present invention comprises a rectangular sail driven chain and sprocket assembly connected to a turbine generator for producing electrical energy from wind. While a particular example of such an invention has been disclosed herein, it will be apparent that various modifications and additions will occur to those having the benefit of the disclosure herein. By way of example, the chains and sprockets shown herein are similar to chains and sprockets commonly used on bicycles. Other types of chains and sprockets may be employed instead. Accordingly, the scope hereof is limited only by the accompanying claims and not by the illustrated example.

I claim:

1. An electrical generating apparatus responsive to incident wind to rotate a turbine generator; the apparatus comprising:

a frame having a self-supporting vertically oriented triangular structure elevated from a ground surface and defined by a base segment parallel to said ground surface, a first incline segment and an opposed second incline segment both angled relative to said base segment;

a plurality of freely rotatable sprockets at each vertex of the self-supporting triangular structure;

at least one chain formed as a closed loop and engaging said sprockets for rotation about said frame;

at least one sail attached to said chain for catching said incident wind at an angle offset therefrom for propelling said chain around said frame; and a linkage driven by said chain in response to said incident wind and connected to said turbine generator for producing electrical energy in response to said incident wind engaging said sail;

wherein said at least one sail is exposed to said incident wind over an entirety of its incursion about said base segment, said first incline segment, and said second incline segment.

2. The apparatus recited in claim 1 wherein said frame is defined by parallel triangular sides;

a pair of said chains in respective loops, each engaging the respective sprockets of one of said triangular sides; and a plurality of said sails each attached to both of said chains of said pair of chains for catching said incident wind.

3. The apparatus recited in claim 2 wherein said plurality of sails comprises three rectangular sails spaced about equidistantly about said chain loops.

4. The apparatus recited in claim 1 wherein said chain is propelled by said incident wind for rotation about a horizontal axis.

5. A wind turbine apparatus comprising:

a self-supporting vertically oriented triangular frame elevated from a ground surface and defined by a base segment parallel to said ground surface, a first incline segment and an opposed second incline segment both angled relative to said base segment;

two sets of rotatable sprockets distributed in respective planes at each vertex of the frame;

a pair of closed loop parallel chains engaging said sprockets for synchronous motion of the respective chains in each of said respective planes;

a plurality of wind trapping sails attached between said chains for propelling said chains in rotation about a common horizontal axis in response to incident wind at an angle offset therefrom, said wind trapping sails being exposed to said incident wind over an entirety of its incursion about said base segment, said first incline segment, and said second incline segment in said rotation about said common horizontal axis; and an electrical generator interconnected by a linkage to said chains for producing electrical energy in response to said incident wind.

6. The apparatus recited in claim 5 wherein said plurality of sails comprises three sails spaced equidistantly about said parallel chain loops.

* * * * *